United States Patent
Kapoor et al.

(10) Patent No.: US 11,318,924 B1
(45) Date of Patent: May 3, 2022

(54) TORQUE DISTRIBUTION SYSTEM FOR REDISTRIBUTING TORQUE BETWEEN AXLES OF A VEHICLE

(71) Applicant: GM GLOBAL TECHNOLOGY OPERATIONS LLC, Detroit, MI (US)

(72) Inventors: Saurabh Kapoor, Markham (CA); Naser Mehrabi, Richmond Hill (CA); Seyedeh Asal Nahidi, North York (CA); SeyedAlireza Kasaiezadeh Mahabadi, Novi, MI (US); James H. Holbrook, Fenton, MI (US); Hualin Tan, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/145,616

(22) Filed: Jan. 11, 2021

(51) Int. Cl.
*B60W 10/119* (2012.01)
*B60K 17/34* (2006.01)
(Continued)

(52) U.S. Cl.
CPC .......... *B60W 10/119* (2013.01); *B60K 17/34* (2013.01); *B60K 23/0808* (2013.01); *B60W 10/04* (2013.01); *B60W 2510/20* (2013.01); *B60W 2520/10* (2013.01); *B60W 2520/105* (2013.01); *B60W 2520/125* (2013.01); *B60W 2520/14* (2013.01); *B60W 2520/20* (2013.01); *B60W 2520/30* (2013.01); *B60W 2520/406* (2013.01); *B60W 2530/201* (2020.02)

(58) Field of Classification Search
CPC .............. B60W 10/119; B60W 10/04; B60W 2510/20; B60W 2520/10; B60W 2520/105; B60W 2520/125; B60W 2520/14; B60W 2520/20; B60W 2520/30; B60W 2520/406; B60W 2530/201; B60K 17/34; B60K 23/0808
See application file for complete search history.

(56) References Cited

U.S. PATENT DOCUMENTS

| 4,750,124 A | 6/1988 | Lin et al. |
| 6,035,251 A | 3/2000 | Hac et al. |

(Continued)

FOREIGN PATENT DOCUMENTS

DE 102012222197 A1 * 6/2014 ...... B60W 30/18063

*Primary Examiner* — Justin Holmes (57) ABSTRACT

An axle torque distribution system includes a memory and a control module. The memory stores a steering angle and a toque distribution algorithm. The control module executes the torque distribution algorithm to: obtain the steering angle; based on the steering angle, determine total lateral force requested for axles of a vehicle; based on the total lateral force requested, determine lateral forces requested for the axles while constraining lateral force distribution between the axles, where the constraining of the lateral force distribution includes, based on maximum lateral force capacities of tires of the vehicle, limiting the lateral forces requested for the axles; determine available longitudinal capacities for the axles based on the lateral forces requested respectively for the axles; determine torque capacities of the axles based on the lateral forces requested respectively for the axles; and control distribution of torque to the axles based on the torque capacities of the axles.

20 Claims, 5 Drawing Sheets

(51) Int. Cl.
*B60K 23/08* (2006.01)
*B60W 10/04* (2006.01)

(56) References Cited

U.S. PATENT DOCUMENTS

| | | | |
|---|---|---|---|
| 6,282,479 B1 | 8/2001 | Ghoneim et al. |
| 6,325,469 B1 | 12/2001 | Carson et al. |
| 6,813,552 B2 | 11/2004 | Ghoneim et al. |
| 6,819,998 B2 | 11/2004 | Lin et al. |
| 6,842,685 B2 | 1/2005 | Belvo et al. |
| 6,856,885 B2 | 2/2005 | Lin et al. |
| 6,856,886 B1 | 2/2005 | Chen et al. |
| 6,865,468 B2 | 3/2005 | Lin et al. |
| 6,879,898 B2 | 4/2005 | Ghoneim et al. |
| 6,968,261 B2 | 11/2005 | Ghoneim et al. |
| 7,099,759 B2 | 8/2006 | Ghoneim |
| 7,181,326 B2 | 2/2007 | Lin et al. |
| 7,274,984 B2 | 9/2007 | Shin et al. |
| 7,440,824 B2 | 10/2008 | Chen et al. |
| 7,571,030 B2 | 8/2009 | Ryu et al. |
| 7,571,039 B2 | 8/2009 | Chen et al. |
| 7,672,765 B2 | 3/2010 | Moshchuk et al. |
| 7,706,941 B2 | 4/2010 | Majersik et al. |
| 7,788,007 B2 | 8/2010 | Moshchuk et al. |
| 7,835,846 B2 | 11/2010 | Chen et al. |
| 7,865,296 B2 | 1/2011 | Ryu et al. |
| 7,908,112 B2 | 3/2011 | Nardi et al. |
| 7,917,270 B2 | 3/2011 | Katrak et al. |
| 7,991,529 B2 | 8/2011 | Nardi et al. |
| 8,050,838 B2 | 11/2011 | Ryu et al. |
| 8,073,597 B2 | 12/2011 | Nardi et al. |
| 8,078,351 B2 | 12/2011 | Nardi et al. |
| 8,086,367 B2 | 12/2011 | Ryu et al. |
| 8,095,309 B2 | 1/2012 | Ryu et al. |
| 8,108,103 B2 | 1/2012 | Moshchuk et al. |
| 8,326,487 B2 | 12/2012 | Moschuk et al. |
| 8,428,819 B2 | 4/2013 | Moshchuk et al. |
| 8,457,841 B2 | 6/2013 | Knoll et al. |
| 8,521,385 B2 * | 8/2013 | Tronnberg ............ B60W 30/02 701/69 |
| 8,684,115 B2 | 4/2014 | Bryant |
| 8,718,868 B2 | 5/2014 | Petrucci et al. |
| 8,855,856 B2 | 10/2014 | Ryu et al. |
| 8,890,747 B2 | 11/2014 | Nardi et al. |
| 8,983,722 B2 | 3/2015 | Moshchuk et al. |
| 2005/0149243 A1 | 7/2005 | Ghoneim |
| 2006/0064215 A1 | 3/2006 | Turski et al. |
| 2010/0131141 A1 | 5/2010 | Ryu et al. |
| 2010/0198445 A1 | 8/2010 | O'Dea et al. |
| 2011/0257826 A1 * | 10/2011 | Yu .................... B60K 6/448 701/31.4 |
| 2012/0029769 A1 | 2/2012 | Chen et al. |
| 2012/0059547 A1 | 3/2012 | Chen et al. |

* cited by examiner

TORQUE DISTRIBUTION SYSTEM FOR REDISTRIBUTING TORQUE BETWEEN AXLES OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle torque distribution systems.

An all-wheel drive (AWD) vehicle is capable of providing power full-time or on-demand to all wheels of the vehicle. As an example, an AWD vehicle can include a front axle having a first pair of wheels and a rear axle having a second pair of wheels. The front axle may be driven by a front electric motor. The rear axle may be driven by an internal combustion engine. An electronic control unit (ECU) may control power supplied to the front wheels via the front electric motor and power supplied to the rear wheels via the engine.

SUMMARY

An axle torque distribution system is provided and includes a memory and a control module. The memory is configured to store a steering angle and a toque distribution algorithm for distributing torque to a first axle and a second axle of a vehicle. The control module is configured to execute the torque distribution algorithm to: obtain the steering angle; based on the steering angle, determine a total lateral force requested for the first axle and the second axle; based on the total lateral force requested, determine a lateral force requested for the first axle and a lateral force requested for the second axle while constraining lateral force distribution between the first axle and the second axle, where the constraining of the lateral force distribution includes, based on maximum lateral force capacities of tires of the vehicle, limiting the lateral force requested for the first axle and the lateral force requested for the second axle; determine available longitudinal capacities for the first axle and the second axle based on the lateral forces requested respectively for the first axle and the second axle; determine torque capacities of the first axle and the second axle based on the lateral forces requested respectively for the first axle and the second axle; and control distribution of torque to the first axle and the second axle based on the torque capacities of the first axle and the second axle.

In other features, the axle torque distribution system further includes: a first torque source configured to supply torque to the first axle of the vehicle; and a second torque source configured to supply torque to the second axle of the vehicle. The control module is configured to control torque output of the first torque source and torque output of the second torque source based on the torque capacities of the first axle and the second axle.

In other features, the first axle is a front axle of the vehicle. The second axle is a rear axle of the vehicle.

In other features, the control module is configured to: determine a lateral acceleration requested based on the steering angle input, a slip angle of the first axle, a slip angle of the second axle, a longitudinal velocity, and wheel base length of the vehicle; and determine the total lateral force requested based on the lateral acceleration requested.

In other features, the control module is configured to determine the longitudinal velocity based on a longitudinal acceleration of the vehicle, a yaw rate of the vehicle, and a speed of the vehicle.

In other features, the control module is configured to determine the lateral force for the first axle and the lateral force for the second axle such that a total yaw moment equilibrium of the vehicle is achieved.

In other features, the control module is configured to determine: a first product based on a lateral force requested for the first axle and a distance between the first axle and a center of gravity of the vehicle; a second product based on a lateral force requested for the second axle and a distance between the second axle and the center of gravity of the vehicle; and the lateral force requested for the first axle and the lateral force requested for the second axle based on a sum of (i) a difference between the first product and the second product, and (ii) a torque at the center of gravity of the vehicle due to a yaw moment of the vehicle.

In other features, the control module is configured to, while limiting lateral force distribution to the first axle and the second axle, (i) limit the lateral force requested for the first axle to a determined maximum lateral force for the first axle, and (ii) limit the lateral force requested for the second axle to a determined maximum lateral force for the second axle.

In other features, the control module is configured to: limit the lateral force requested for the first axle based on a current road condition and a first normal tire force; and limit the lateral force requested for the second axle based on the current road condition and a second normal tire force.

In other features, the control module is configured to: limit the lateral force requested for the first axle based on a first longitudinal force; and limit the lateral force requested for the second axle based on a second longitudinal force.

In other features, the control module is configured to determine: the available longitudinal capacity for the first axle based on a first normal force and the first requested lateral force; and the available longitudinal capacity for the second axle based on a second normal force and the second requested lateral force.

In other features, the control module is configured to: generate a first tire capacity for the first axle based on a longitudinal force of the first axle and a first decay rate; generate a second tire capacity for the second axle based on a longitudinal force of the second axle and a second decay rate; determine a torque capacity of the first axle based on the first tire capacity; and determine a torque capacity of the second axle based on the second tire capacity.

In other features, the control module is configured to: determine the torque capacity of the first axle based on an effective rolling radius of a tire; and determine the torque capacity of the second axle based on the lateral force requested for the second axle and the effective rolling radius of the tire.

In other features, a method of distributing torque to a first axle and a second axle of a vehicle is provided. The method includes: receiving a steering angle; based on the steering angle, determining a total lateral force requested for the first axle and the second axle; and based on the total lateral force requested, determining a lateral force requested for the first axle and a lateral force requested for the second axle while constraining lateral force distribution between the first axle and the second axle. The constraining of the lateral force distribution includes, based on maximum lateral force capacities of tires of the vehicle, limiting the lateral force requested for the first axle and the lateral force requested for the second axle. The method further includes: determining available longitudinal capacities for the first axle and the second axle based on the lateral forces requested respectively for the first axle and the second axle; determining torque capacities of the first axle and the second axle based on the lateral forces requested respectively for the first axle and the second axle; and controlling distribution of torque to the first axle and the second axle based on the torque capacities of the first axle and the second axle.

In other features, the method further includes: determining a lateral acceleration requested based on the steering angle, a slip angle of the first axle, a slip angle of the second axle, a longitudinal velocity, and wheel base length of the vehicle; determining the total lateral force requested based on the lateral acceleration requested; and determining the longitudinal velocity based on a longitudinal acceleration of the vehicle, a yaw rate of the vehicle, and a speed of the vehicle.

In other features, the method further includes: determining the lateral force for the first axle and the lateral force for the second axle such that a total yaw moment equilibrium of the vehicle is achieved; determining a first product based on a lateral force requested for the first axle and a distance between the first axle and a center of gravity of the vehicle; determining a second product based on a lateral force requested for the second axle and a distance between the second axle and the center of gravity of the vehicle; and determining the lateral force requested for the first axle and the lateral force requested for the second axle based on a sum of (i) a difference between the first product and the second product, and (ii) a torque at the center of gravity of the vehicle due to a yaw moment of the vehicle.

In other features, the method further includes, while limiting lateral force distribution to the first axle and the second axle, (i) limiting the lateral force requested for the first axle to a determined maximum lateral force for the first axle, and (ii) limiting the lateral force requested for the second axle to a determined maximum lateral force for the second axle.

In other features, the method further includes: limiting the lateral force requested for the first axle based on a current road condition, a first normal tire force and a first longitudinal force; limiting the lateral force requested for the second axle based on the current road condition, a second normal tire force and a second longitudinal force; determining the available longitudinal capacity for the first axle based on a first normal force and the first requested lateral force; and determining the available longitudinal capacity for the second axle based on a second normal force and the second requested lateral force.

In other features, the method further includes: generating a first tire capacity for the first axle based on a longitudinal force of the first axle and a first decay rate; generating a second tire capacity for the second axle based on a longitudinal force of the second axle and a second decay rate; determining a torque capacity of the first axle based on the first tire capacity; and determining a torque capacity of the second axle based on the second tire capacity.

In other features, the method further includes: determining the torque capacity of the first axle based on an effective rolling radius of a tire; and determining the torque capacity of the second axle based on the lateral force requested for the second axle and the effective rolling radius of the tire.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Achieving optimal vehicle lateral performance, especially in limit-handling scenarios, is challenging due to multiple uncertainties. An example limit-handling scenario includes a vehicle operating at adhesion to road (or traction) limits, prior to either losing traction during high-speed cornering or while braking resulting in the wheels of the vehicle "locking-up" and a skid condition occurring. Uncertainties can arise, for example, when conflicting and/or inaccurate sensor data and/or other collected environmental information is obtained. As a result, the true current condition of a road and/or operating environment may be indeterminable.

In some scenarios, such as during high-performance driving, a control system may attempt to sustain a maximum amount of lateral acceleration while the corresponding vehicle is cornering. During hard cornering maneuvers, maximum possible lateral accelerations are targeted to enable sharper turns and higher corner-exiting speeds. The manner in which torque is distributed to axles and wheels of a vehicle affect lateral motion. For example, too much torque distributed a front axle, such that the front axle is saturated, results in vehicle understeering and following a path radially outward of a targeted path. If too much torque is distributed to a rear axle, the rear axle is then saturated, which results in the vehicle oversteering and following a path radially inward of a targeted path. Also, when an axle is saturated, lateral force (or traction) capacity decreases to a point when a skid condition occurs.

The examples disclosed herein include distributing torque to front and rear axles of a vehicle to maximize lateral forces for maximum lateral tire grip (or traction) during cornering. The examples are applicable to implementations where generated torque is split and distributed to front and rear axles and to implementations where torque is independently controlled and distributed to each wheel of a vehicle. An amount of output torque is determined based on a driver torque request. The amount of driver torque requested may be determined based on position of an accelerator pedal. The output torque is then distributed to the axles and wheels of the vehicle while maximizing lateral forces experienced by tires of the vehicle.

Figure 1:
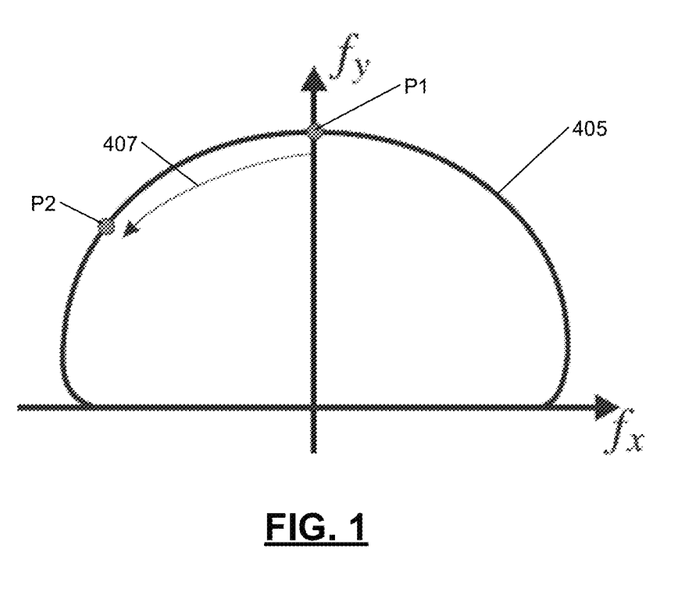
FIG. 1 shows an example tire capacity plot in accordance with the present disclosure.

FIG. 1 shows an example tire capacity plot illustrating longitudinal tire force $f_x$ and lateral tire force $f_y$ for a certain vehicle and operating environment. The longitudinal and lateral tire forces $f_x$, $f_y$ (identified as $F_X$, $F_Y$ below). The plot is generally elliptical shaped and the larger the ellipse, the larger the longitudinal and lateral forces. The larger the longitudinal and lateral forces, the more tire capacity before an unstable condition arises, such as loss in traction causing the tire to slip on a road surface. The longitudinal and lateral forces are coupled such that as one of the longitudinal force and the lateral force increases, the other one of the longitudinal force and lateral force decreases. The right side of the y-axis (or lateral force axis) is associated with corning and the left side of the lateral force axis is associated with braking. For each amount of longitudinal force along the x-axis, there is a maximum amount of lateral force, shown by points along the plotted curve shown. Thus, while cornering, as longitudinal force increases, the amount of tire capacity (lateral force available) decreases.

Traditionally, actual lateral forces are monitored and tire forces are kept within the capacity limits associated with the tire capacity plot such that any additional torque request of a driver is not satisfied (or ignored). Although the actual lateral forces are monitored, the lateral forces are not necessarily maximized. In other words, in certain conditions, additional lateral forces could be generated.

The examples set forth herein include monitoring vehicle behavior and driver requested output torque in order to be able to provide additional lateral acceleration and further maximize lateral forces. Longitudinal performance of a vehicle is controlled to maximize lateral forces. As an example, if a first one of the axles (front or rear) is saturated (i.e. more torque requested and/or provided to the axle, then there is tire capacity available for that axle), then the available lateral force capacity of the other axle is checked. If the other axle has available lateral force capacity, then output torque is distributed (or redistributed) to the other axle to either unsaturate the first axle or saturate both axles. The point when both axles become saturated, is the point when maximum lateral forces and maximum lateral grip has occurred.

While controlling distribution or redistribution of output torque, the longitudinal and lateral forces may be limited based on the corresponding tire capacity plot so as not to lose cornering and/or braking performance. Torque distribution and redistribution may include the balancing of torque between front and rear axles to provide the best toque split for (i) achieving the output torque and/or lateral acceleration requested by the driver, and/or (ii) achieving a maximum amount of lateral acceleration. This may provide the lateral acceleration that the vehicle is capable of providing. This may include controlling front and aft torque distribution and may include controlling left and right differential torque distribution. Torque shift is provided to maximize grip considering yaw motion capability available.

The examples are applicable to situations when a torque request is not satisfied and to situations when torque requests exceeding tire capacity limits is satisfied. As an example, a driver of a truck may request more output torque then appropriate for a corresponding tire capacity plot, the control system may ignore (or not honor) the additional output torque requested. As another example, in a performance vehicle (or sports car), a driver may want to purposefully drift the vehicle. As a result, the driver may request additional output torque, which saturates an axle and causes lateral forces to exceed tire capacities. This additional output torque may be provided to allow the driver to drift the vehicle. The vehicle is laterally sliding during a drift condition.

In the absence of true estimates of a road condition, the disclosed examples account for real-time tire capacities to maximize and/or provide appropriate amounts of lateral forces. A road condition refers to whether the road is dry, wet, iced over, etc. The examples are designed for torque redistribution and thus suitable for different driveline configurations. The examples are applicable to vehicles having different propulsion system configurations, such as an all-electric vehicle including one or more electric motors for providing torque to wheels of each axle of the vehicle. The examples are also applicable to hybrid vehicles, where one axle receives torque from one or more electric motors and the other axle receives torque from an engine. The examples are further applicable to other propulsion systems providing output torque to front and rear axles of a vehicle. The examples are applicable thus to all-wheel drive (AWD) vehicles.

The examples redistribute a driver's torque request, enhancing lateral performance of an AWD vehicle and aid a driver in achieving and sustaining a peak lateral grip. The examples (i) determine a driver's lateral acceleration requested, for example, by monitoring a steering wheel angle, (ii) account for real-time tire capacity estimates to update and control actions taken, (iii) coordinate with direct yaw control actuators (e.g., electric motors or an engine of a vehicle), and (iv) support AWD drivetrains. Direct yaw control may be provided at each wheel of a vehicle or differential powering control may be provided, where left and right wheels of each axle are coupled but receive different amounts of torque.

The examples include an algorithm to redistribute axle torque to maximize lateral performance of a vehicle, which is robust to changes in road conditions and applicable to all AWD driveline configurations. The algorithm is designed to aid a driver in achieving a best balance of torque distribution under all phases of cornering. The phases refer to entry, mid-corner, and exist portions of a turn. The algorithm has a substantial positive effect on vehicle behavior between the transition from mid-corner to corner exit (also referred to as the "on-throttle phase") to maintain the vehicle on a target path. This includes preventing and/or reducing the possibility of understeer, aiding rotation of the vehicle, powering oversteer, reducing the possibility of oversteer, and/or maximizing exit speed out of a turn. The algorithm includes continuously monitoring the vehicle states and driver inputs and redistributes axle torque as required. As an example, when the rear axle of the vehicle is saturated, sending torque to the front axle can help recover the vehicle from a fishtailing condition. As another example, when the front axle is saturated, sending torque to the rear axle can aid in recovering the vehicle from an understeer condition. As another example, in addition to the above-stated propulsion systems, the algorithm is also applicable to a vehicle including three electric motors; one for driving a front axle and two for driving rear axles. The algorithm provides improved vehicle stability and driver experience.

Figure 2:
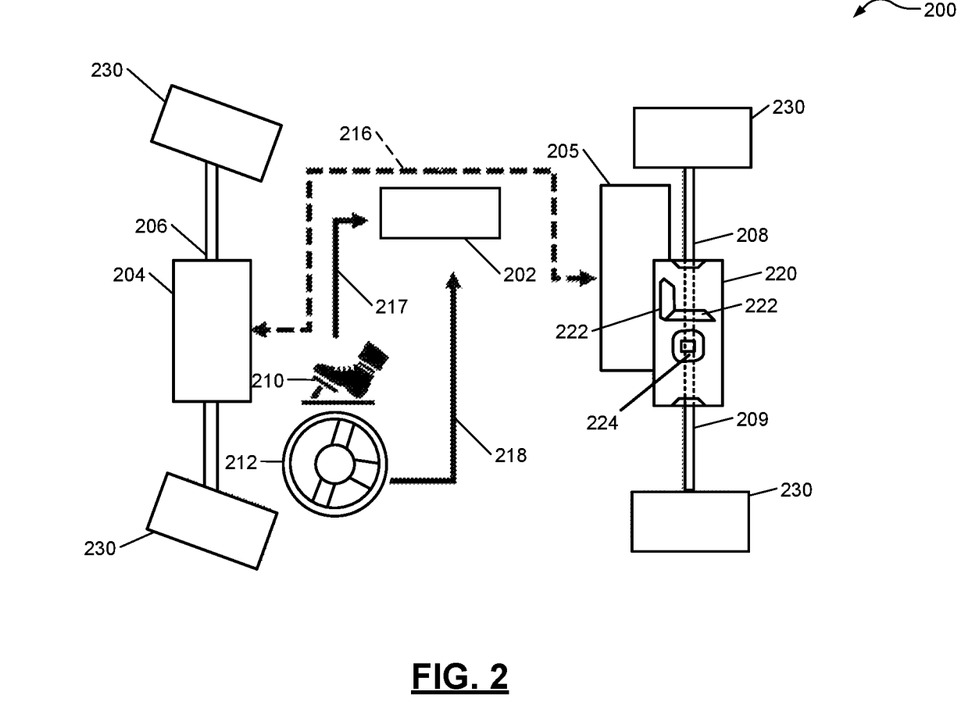
FIG. 2 shows a portion of an example of an axle torque redistribution system in accordance with the present disclosure.

FIG. 2 shows a portion 200 of an axle torque redistribution system of a vehicle. The axle torque redistribution system (also referred to as the axle torque distribution system) includes a control module 202, multiple torque sources 204, 205, a front axle 206, a rear axles 208, 209, a user input device 210, and a steering device (e.g., steering wheel) 212. The control module 202 controls distribution and redistribution of output torque to the axles 206, 208 based on a torque request provided by a driver via the user input device 210 (e.g., an accelerator pedal) and a steering angle (e.g., angle of a steering wheel). Distribution of output torque is represented by dashed line 216 and inputs from the user input device 210 and the steering device 212 are represented by arrows 217, 218. The control module 202 may implement the algorithms disclosed herein.

The torque sources 204, 205 may include electric motors, an engine, and/or other torque sources (or rotational energy power sources). In the example shown in FIG. 2, the torque source 204 is an electric motor and the torque source 205 is a rear engine. The rear engine is connected to the rear axle 208 via a differential transfer case 220, which includes gears 222, and a differential 224. The axles 206, 208, 209 are connected to and drive tires 230.

Figure 3:
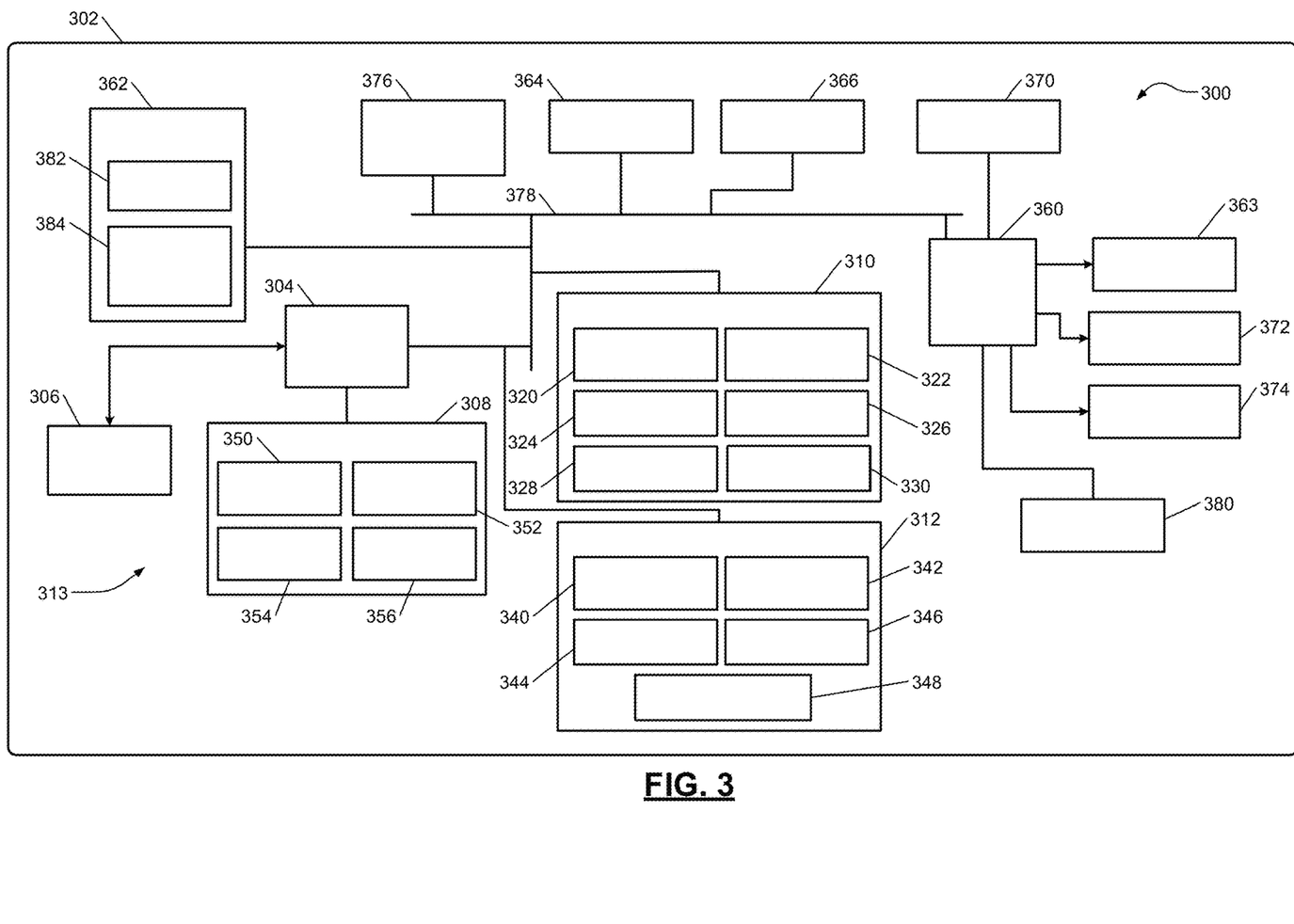
FIG. 3 shows an axle torque redistribution system in accordance with the present disclosure.

FIG. 3 shows an axle torque redistribution system 300 of a vehicle 302. The axle torque redistribution system 300 may operate similarly and/or be configured similarly as the axle torque redistribution system of FIG. 2. The axle torque redistribution system 300 may include a chassis control module 304, torque sources such as one or more electric motors 306 and one or more engines (one engine 308 is shown), vehicle sensors 310, and memory 312. The chassis control module 304 may control distribution and redistribution of output torque to axles of the vehicle 302 via the torque sources. The chassis control module 304 may control operation of a propulsion system 313 that includes the electric motor(s) 306 and the engine(s) 308.

The sensors 310 may include a steering sensor 320 (e.g., a steering wheel sensor), a vehicle speed sensor 322, accelerometers 324, an accelerator pedal sensor 326, a yaw rate sensor 328 and other sensors 330. The chassis control module 304 controls the torque sources based on outputs of the sensors 310.

The memory 312 may store vehicle states 340, tire forces 342, driver inputs 344, actuator constraints 346, and other parameters and data 348. The vehicle states 340 may include longitudinal, lateral and vertical forces $F_X$, $F_Y$, $F_Z$. The tire forces 342 may indicate tire capacity levels. Driver inputs 344 may refer to accelerator pedal positions, steering wheel angles, and/or other driver inputs. The actuator constraints 346 may include maximum output torques of the torque sources (or how much output torque each torque source is capable of generating). The engine 308 may include a starter motor 350, a fuel system 352, an ignition system 354 and a throttle system 356.

The vehicle 302 may further include a body control module (BCM) 360, a telematics module 362, a brake system 363, a navigation system 364, an infotainment system 366, an air-conditioning system 370, other actuators 372, other devices 374, and other vehicle systems and modules 376. The modules and systems 304, 360, 362, 364, 366, 370, 376 may communicate with each other via a controller area network (CAN) bus 378. A power source 380 may be included and power the BCM 360 and other systems, modules, devices and/or components. The power source 380 may include one or more batteries and/or other power sources.

The telematics module 362 may include transceivers 382 and a telematics control module 384. The BCM 360 may control the modules and systems 362, 363, 364, 366, 370, 376 and other actuators, devices and systems (e.g., the actuators 372 and the devices 374). This control may be based on data from the sensors 310.

Figure 4:
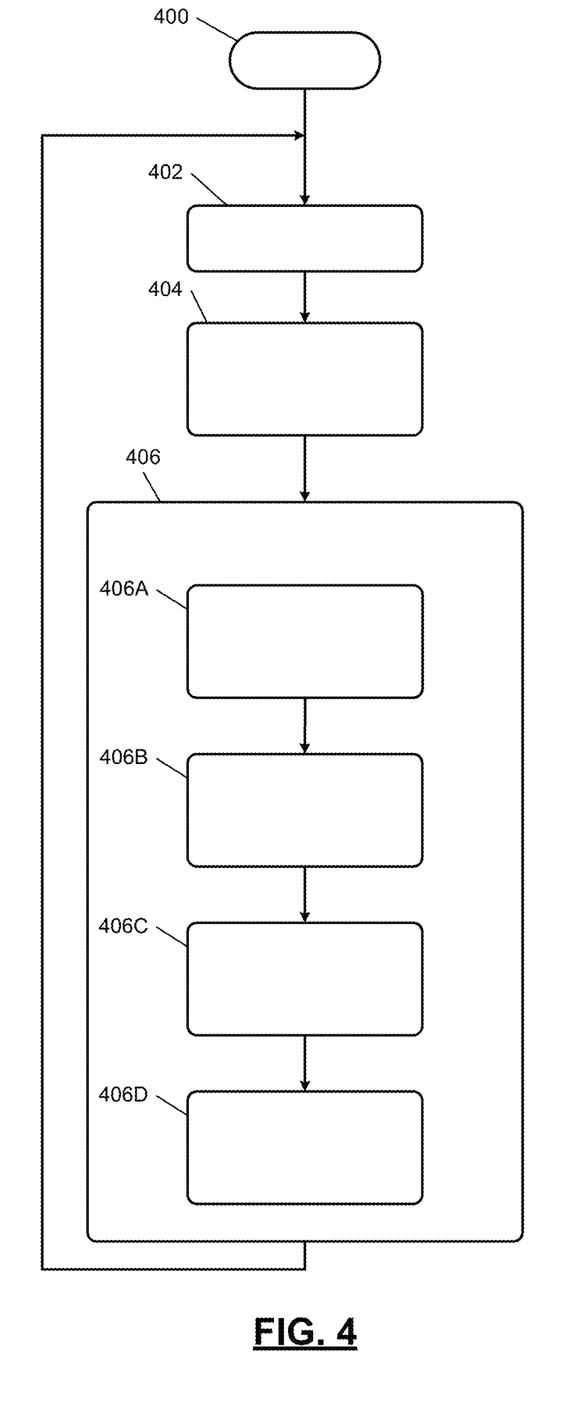
FIG. 4 illustrates an example axle torque redistribution method for all-wheel drive vehicles in accordance with the present disclosure.

FIG. 4 shows an example axle torque redistribution method, which includes executing the above-described algorithm. The algorithm is applicable to limit-handling situations as well as non-limit-handling situations. Driving at tire capacity limits is an example of a limit-handling situation. Tire capacities and vehicle lateral grip are accounted for to distribute the appropriate levels of torque to each axle. Operations of the method may be iteratively performed by a control module, such as one of the chassis control module 304 of FIG. 3, the control module 202 of FIG. 2, or other control module. The control module is able to seamlessly transition from sub-limit-handling to a limit-handling situation and then to beyond limit-handling (e.g., in a purposeful drifting situation).

The method may begin at 400. At 402, the control module collects sensor data and driver inputs, such as via the sensors 310 and/or similar sensors.

At 404, the control module determines vehicle states, tire forces, and actuator constraints, such as described above. The tire forces may include longitudinal, lateral and vertical (or normal) tire forces. The actuator constraints may include maximum torque levels each actuator is able to generate. At 406, an axle torque redistribution process is performed, which includes a multi-step algorithm to determine output torques to be provided by torque sources to front and rear axles of a vehicle.

At 406A, the control module determines driver requested lateral forces $F_{Y,F}^{Req}$ and $F_{Y,R}^{Req}$. An objective of the methodology is to enhance the limit-handling lateral characteristics of the vehicle and thus the control module accounts for driver's intentions. Quantifying driver's intentions aids in separating limit-handling and non-limit-handling scenarios. This separation is a variable that defines the direction, rate, and magnitude of the control actions. The control module uses the driver's requested total lateral force to quantify the driver's cornering intentions. Total lateral force allows seamless transition between limit-handling and non-limit-handling scenarios.

The driver requested lateral forces $F_{Y,F}^{Req}$ and $F_{Y,R}^{Req}$ are calculated based on the driver's lateral acceleration requested $a_Y^{Req}$. According to vehicle lateral dynamics, Ackermann steering geometry and forward speed of the vehicle, the lateral acceleration may be determined using equation 1, where δ is steering angle, $\alpha_F$ and $\alpha_R$ are front axle and rear axle slip angles, L is a vehicle wheel base (or distance between front and rear axles, and $V_x$ is longitudinal velocity. The longitudinal velocity $V_x$ is determined based on longitudinal acceleration, yaw rate, and speed of the vehicle.

$$a_Y^{Req} = \frac{\delta - (\alpha_F - \alpha_R)}{L} V_x^2 \qquad (1)$$

The lateral force may be determined using equation 2, where m is mass of the vehicle. Equation 2 may represent how longitudinal forces should be distributed to generate specific lateral force capacities at each axle to provide requested lateral acceleration. Equation 2 is based on Newton's second law and provides the total lateral force for the front and rear axles.

$$ma_Y^{Req} = F_{Y,F}^{Req} + F_{Y,R}^{Req} \qquad (2)$$

The control module may account for maximum torque capability limits of torque sources (or actuators) when determining whether to honor torque requests. For example, when a motor is unable to produce a certain amount of torque, the torque request may not be honored.

At 406B, the control module determines total lateral force for constrained lateral force distribution. The total lateral force is obtained. The total lateral force is distributed between the front and rear axles to achieve maximum cornering performance. While cornering, achieving optimal lateral force distribution is needed to achieve a maximum amount of lateral grip. Unbalanced lateral forces at the center of gravity (CG) of the vehicle can make the vehicle susceptible to instability (e.g., understeer or oversteer behavior). At 406B, the control module distributes lateral force such that the total yaw moment equilibrium of the vehicle can be achieved. The yaw moment equilibrium may be defined by equation 3, where $L_F$ and $L_R$ are respective distances between the center of gravity of the vehicle and the front and rear axles, and where $\Delta T_{DYC}$ refers to direct torque at center of gravity due to yaw moment of the vehicle, not due to wheel torque.

$$L_F F_{Y,F}^{Req} - L_R F_{Y,R}^{Req} + \Delta T_{DYC} = 0 \tag{3}$$

In the presence of direct yaw control actuators in the drivetrain, the external moment is considered in the $\Delta T_{DYC}$ term, which has a units-of-measure of torque. Based on equations 2 and 3, the requested lateral forces $F_{Y,F}^{Req}$ and $F_{Y,R}^{Req}$ may be determined for maximum capacity of lateral grip (or maximum lateral grip or acceleration), which may occur when the yaw rate is 0. To achieve maximum grip, no unused capacity at any axle remains. Front and rear axles are saturated at the same time, which is referred to as a steady-state condition where the yaw rate is 0. If equation 3 is satisfied, then the system is at steady-state condition for yaw motion. With equations 2-3 there are two unknowns, specifically the requested lateral forces $F_{Y,F}^{Req}$ and $F_{Y,R}^{Req}$ to maintain maximum lateral grip, and two equations.

In addition to appropriately distributing lateral force between the front and rear axles for approaching optimal lateral force distribution, the control module accounts for physical limits of lateral force on the tires of the vehicle. This is especially true for scenarios where a driver requests excessive lateral force (i.e., higher than remaining capacity of the tires). The maximum available lateral force for each of the axles $F_{Y,F}^{max}$ and $F_{Y,R}^{max}$ may be determined according to equations 4-5 using a friction-ellipse tire model, such as the tire model shown in FIG. 1, where $\mu$ indicates a current road condition, $F_{Z,LF}$, $F_{Z,RF}$, $F_{Z,LR}$, $F_{Z,RR}$ are the normal tire forces for the left-front, right-front, left-rear, and right-rear tires of the vehicle, $F_{X,LF}$, $F_{X,RF}$, $F_{X,LR}$, $F_{X,RR}$ are the longitudinal forces for the stated tires.

$$F_{Y,F}^{max} = \sqrt{(\mu F_{Z,LF})^2 - (F_{X,LF})^2} + \sqrt{(\mu F_{Z,RF})^2 - (F_{X,RF})^2} \tag{4}$$

$$F_{Y,R}^{max} = \sqrt{(\mu F_{Z,LR})^2 - (F_{X,LR})^2} + \sqrt{(\mu F_{Z,RR})^2 - (F_{X,RR})^2} \tag{5}$$

The maximum lateral force for the left-front tire is equal to $\sqrt{(\mu F_{Z,LF})^2 - (F_{X,LF})^2}$. The maximum lateral force for the right-front tire is equal to $\sqrt{(\mu F_{Z,RF})^2 - (F_{X,LF})^2}$. The maximum lateral force for the left-rear tire is equal to $\sqrt{(\mu F_{Z,LR})^2 - (F_{X,LR})^2}$. The maximum lateral force for the right-rear tire is equal to $\sqrt{(\mu F_{Z,RR})^2 - (F_{X,RR})^2}$. As a result, requested lateral forces $F_{Y,F}^{Req}$ and $F_{Y,R}^{Req}$ are bounded (limited) as represented by expressions 6 and 7. A road condition $\mu$ of 1 may refer to a dry road condition. A road condition $\mu$ of 0.1 may refer to an icy road condition. A road condition $\mu$ of 0.4 may refer to a snow covered road condition.

$$|F_{Y,F}^{max}| \geq |F_{Y,F}^{Req}| \tag{6}$$

$$|F_{Y,R}^{max}| \geq |F_{Y,R}^{Req}| \tag{7}$$

At maximum grip, all tire capacities may be equal to each other. When the maximum capacities are reached for the tires, the maximum capacities may be equal to each other. The control module accounts for tire capacities and vehicle lateral grip when distributing torque to the axles. Tire capacity or lateral force capacity for each axle is a combination of lateral force capacities of left and right tires. The control module may drive at tire capacity limits. A limit-handling situation occurs when approaching a tire capacity limit in the longitudinal and lateral directions. The disclosed algorithm is applicable when operating close and/or at tire capacity limits and is able to seamlessly transition from sub-limit to limit-handling and beyond to, for example, a drifting situation.

At 406C, the control module determines axle torque capacity with real-time correction. In an AWD control system, the control variables are front and rear axle torques. Consequently, the control module is unable to directly affect the lateral forces on the axles. Hence, the control module accounts for a relationship between the axle torque (longitudinal force) and lateral force and performs the following operations based on this relationship. The relationship between longitudinal and lateral forces for tires may be defined using a tire friction-ellipse plot, such as that shown in FIG. 1. FIG. 1 shows two points P1 and P2 for a force curve 405. Based on this relationship, for a given road condition $\mu$ and a normal force $F_Z$, the maximum lateral force $F_Y^{max}$ is a function of a current longitudinal force F. In FIG. 1, the point P1 is associated with equation 8 and the point P2 is associated with equation 9. More lateral force capacity exists at point P1. As longitudinal force is requested, as represented by point P2, the amount of lateral force capacity decreases, as represented by arrow 407. More lateral force is available at point P1 than at point P2 due to an increase in magnitude of longitudinal force when transitioning to point P2. Equations 8 and 9 are the same equation, but represent different operating points. If tuning a rear wheel drive vehicle and all capacity is available for lateral motion, then the maximum lateral force may be represented by equation 8. If however there is some longitudinal force, then lateral capacity may be represented by equation 9.

$$F_Y^{max} = \sqrt{(\mu F_Z)^2 - (F_x)^2} \tag{8}$$

$$F_Y^{max} = \sqrt{(\mu F_Z)^2 - 0} \tag{9}$$

Torque may be distributed to each wheel individually via electric motors, engines, and/or other torque sources. If longitudinal tire forces are the same, instead of determining torque outputs for each wheel, a maximum longitudinal capacity may be determined for each axle. If the maximum capacity for each axle is determined and lateral force to maintain maximum grip is determined, then the longitudinal force for each tire may be determined by the control module.

Based on operations 406A and 406B and the above-stated relationship between longitudinal and lateral forces for tires, the optimal lateral force distribution may be achieved by predefining the longitudinal capacities of the respective axle. If the axle torque is redistributed such that axles are maintained at defined longitudinal capacities $F_{Y,F}^{max}$ and $F_{Y,R}^{max}$, then as defined herein, optimal lateral force distribution is reached. The control module may calculate the available longitudinal capacity for each axle based on the normal force $F_Z$ estimation and requested lateral forces $F_{Y,F}^{Req}$ and $F_{Y,R}^{Req}$ using equations 10 and 11.

$$F_{X,F}^{max} = \sqrt{(\mu F_{Z,F})^2 - (F_{Y,F}^{Req})^2} \tag{10}$$

$$F_{X,R}^{max} = (\mu F_{Z,R})^2 - (F_{Y,R}^{Req})^2 \tag{11}$$

Equations 10 and 11 provide maximum longitudinal forces that may be sent to each axle to maintain maximum grip condition. Any lateral force requests, associated with a torque request, that are below the maximum force values provided by equations 10 and 11 provide enough tire capacity to not necessarily be at a maximum grip condition.

The longitudinal force capacities $F_{Y,F}^{max}$ and $F_{Y,R}^{max}$ are corrected based on real-time tire capacity estimates $F_{Y,F}^{Estmax}$ and $F_{Y,R}^{Estmax}$. These estimates are linked with the lateral and longitudinal saturation of each axle and the yaw stability of the vehicle. This enhances the robustness of the algorithm to changes in the environment (e.g., road condition, tires, etc.). The real-time tire capacity estimates may be based on current estimation of longitudinal forces minus corresponding decay rates, where the decay rates are a function of the severity of the axle saturation and yaw stability of the vehicle. The real-time tire capacity estimates $F_{Y,F}^{Estmax}$ and $F_{Y,R}^{Estmax}$ may refer to corrected estimates and be represented by equations 12 and 13, where min refers to a minimum function that determines a minimum of two values in a parenthetical, $F_{X,F(Prev)}^{Estmax}$ and $F_{X,R(Prev)}^{Estmax}$ refer to previous estimates, $\nabla D_F$ and $\nabla D_R$ are changes in decay rate of front and rear axles, and $\Delta T$ refers to a change in time. Capacities may be decreased, if the decay rate is not changed as targeted and/or expected.

$$F_{X,F}^{Estmax} = \min((F_{X,LF} + F_{X,RF}), (F_{X,F(Prev)}^{Estmax})) - (\nabla D_F \times \Delta T) \quad (12)$$

$$F_{X,R}^{Estmax} = \min((F_{X,LR} + F_{X,RR}), (F_{X,R(Prev)}^{Estmax})) - (\nabla D_R \times \Delta T) \quad (13)$$

After determining the correcting estimates, the control module may determine torque capacities of each axle using equations 14-15, where $R_{eff}$ is an effective rolling radius of a tire.

$$Trq_F^{max} = \min(F_{X,F}^{max}, F_{X,F}^{Estmax}) \times R_{eff} \quad (14)$$

$$Trq_R^{max} = \min(F_{X,R}^{max}, F_{X,R}^{Estmax}) \times R_{eff} \quad (15)$$

With equations 12-13 the control module is accounting for actual forces and with equations 14-15 the control module is checking if maximum torque capacity levels have been reached. Tire capacity or lateral force capacity for each axle is a combination of lateral force capacity on the left side and on the right side. If longitudinal tire forces are the same, instead of determining tire capacities of each tire, maximum longitudinal capacities for each axle may be determined. With maximum capacity of each axle known and lateral force to maintain maximum grip known, longitudinal tire capacity forces at each wheel may be determined.

At 406D, the control module performs axle torque redistribution based on the driveline configuration of the vehicle.

As a first front wheel drive (FWD) biased AWD example, axle torque may be sent to the front axle of the vehicle until a maximum longitudinal capacity is reached. Extra (or additional) torque is then sent to the rear axle. The FWD vehicle may be, for example, a 4-door passenger car or other vehicle. The torque provided to the front and rear axles may be represented by equations 16-17 and then by equations 18-19.

$$Trq_F^{Req} = 1 \times Trq^{Req} \quad (16)$$

$$Trq_R^{Req} = 0 \times Trq^{Req} \quad (17)$$

$$\Delta T_F^{Cmd} = 0 \quad (18)$$

$$\Delta T_R^{Cmd} = Trq_F^{Req} - Trq_F^{max} \quad (19)$$

As a second 50-50 split biased AWD example, axle torque is split 50-50 between the front and rear axles until one of the axles reaches a maximum longitudinal capacity. Extra (or additional) torque is then sent to the other one of the axles. The 50-50 split vehicle may be, for example, a truck or other vehicle. The torque provided to the front and rear axles may be represented by equations 20-21 and then by equations 22-23. Maximum difference between the torques provided to the front and rear axles may be based on whether turning or braking.

$$Trq_F^{Req} = 0.5 \times Trq^{Req} \quad (20)$$

$$Trq_R^{Req} = 0.5 \times Trq^{Req} \quad (21)$$

$$\Delta T_F^{Cmd} = Trq_R^{Req} - Trq_R^{max} \quad (22)$$

$$\Delta T_R^{Cmd} = Trq_F^{Req} - Trq_F^{max} \quad (23)$$

As a third RWD biased AWD example, axle torque is sent to the rear axle until a maximum longitudinal capacity is reached. Extra (or additional) torque is then sent to the front axle. The RWD vehicle may be a sports car or other vehicle. The torque provided to the front and rear axles may be represented by equations 24-25 and then by equations 26-27.

$$Trq_F^{Req} = 0 \times Trq^{Req} \quad (24)$$

$$Trq_R^{Req} = 1 \times Trq^{Req} \quad (25)$$

$$\Delta T_F^{Cmd} = Trq_R^{Req} - Trq_R^{max} \quad (26)$$

$$\Delta T_R^{Cmd} = 0 \quad (27)$$

For at least the above three examples, the torque commanded to the front and rear axles may be provided using equations 28-29, where $\epsilon_T^{Cmd}$ is the split ratio of output torque provided to the front and rear axles. For the above examples and equations 16-30, the conditions of equations 31-32 apply, where $Trq^{Req}$ is the total axle torque requested.

$$Trq_F^{Cmd} = Trq_F^{Req} + \Delta T_F^{Cmd} - \Delta T_R^{Cmd} \quad (28)$$

$$Trq_R^{Cmd} = Trq_R^{Req} + \Delta T_R^{Cmd} - \Delta T_F^{Cmd} \quad (29)$$

$$\varepsilon_T^{Cmd} = \frac{Trq_R^{Cmd}}{Trq^{Req}} \quad (30)$$

$$\Delta T_F^{Cmd} \geq 0; \Delta T_R^{Cmd} \geq 0 \quad (31)$$

$$(Trq_F^{max} + Trq_R^{max}) \geq Trq^{Req} \quad (32)$$

The above examples are provide to explain the adaptability of the method. The method is applicable to all AWD driveline configurations. Although applicable to AWD vehicles, at any moment in time, torque may be applied to one axle (e.g., front or rear axle), and not to another axle (e.g., the other one of the front and rear axle).

When a total torque request is provided, the control module may start distributing toque to the axles depending on the configuration of the chassis. As an example, if the vehicle is rear wheel drive, the control module may start by determining a maximum longitudinal force that the rear axle is able to handle to assure lateral maximum grip condition is not violated. When the maximum lateral grip (or maximum lateral force) has been reached for the rear axle, torque is supplied to the front axle until a limit is reached for the front axle. When both axles are at maximum lateral forces, then maximum grip condition for the vehicle has been reached. If this is, for example, a 4-door sedan, then any torque requests beyond this point may not be honored. If however this is a performance (e.g., sports) car and the driver is intending to cause a drift condition, then the control module may determine which one of the axles to provide the additional torque requested.

Figure 5:
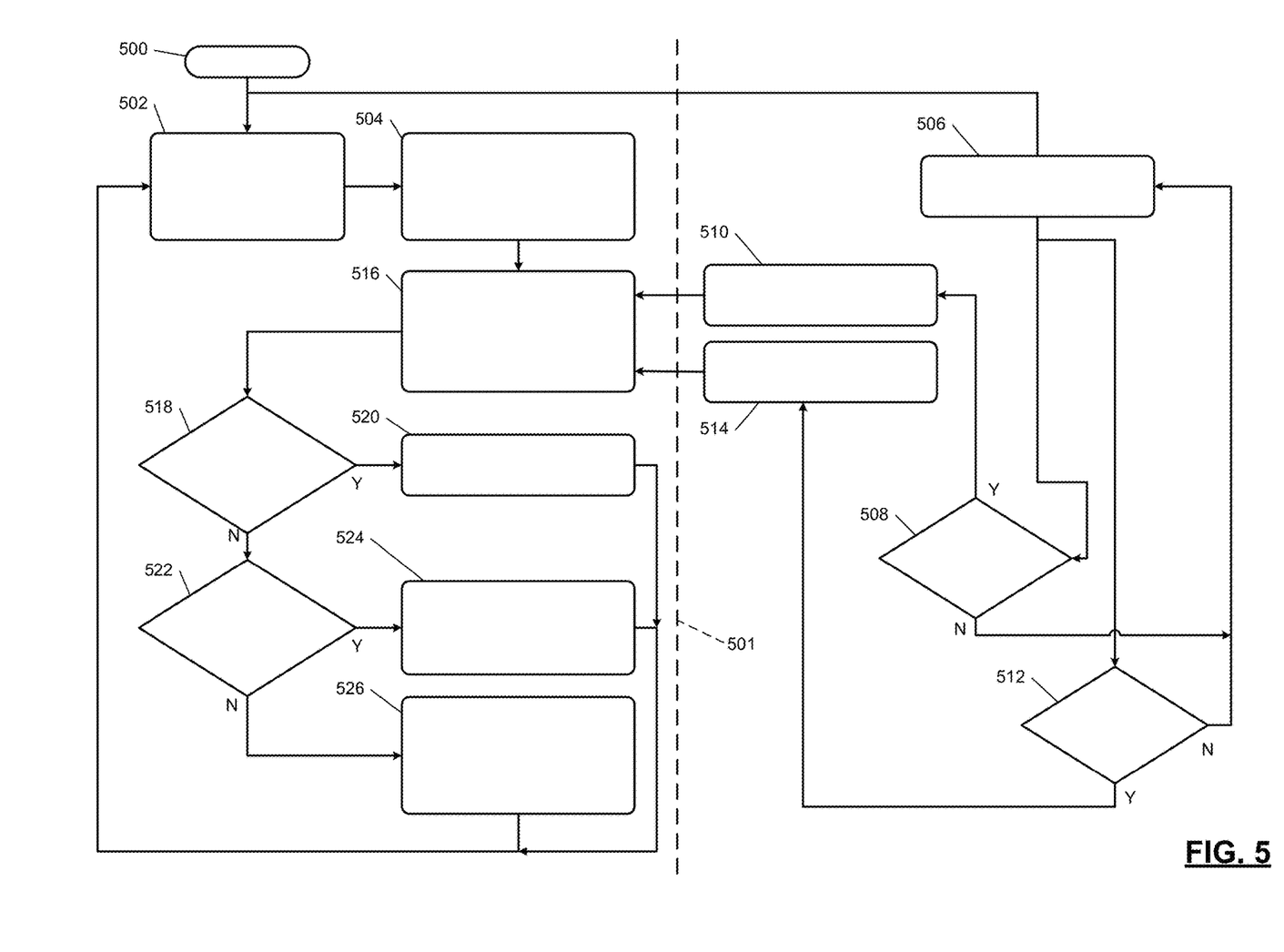
FIG. 5 illustrates an example axle torque redistribution method for a rear-wheel biased all-wheel drive implementation in accordance with the present disclosure.

FIG. 5 shows an axle torque redistribution method for a rear-wheel biased all wheel drive implementation. Although the following example operations are primarily described with respect to a RWD biased AWD vehicle, the operations are applicable to other AWD vehicles including 50-50 split biased and FWD biased AWD vehicles. Similar operations may be performed and/or modified for each of these other AWD vehicles. The operations may be iteratively performed. The operations are separated by a dashed line 501. Operations 502, 504, 516, 518, 520, 522, 524, 526 are associated with torque redistribution control. Operations 506, 508, 510, 512, 514 are associated with real-time correction control for adjusting longitudinal force capacities of front and rear axles. The following operations may be performed by a control module, such as one of the chassis control module 202 of FIG. 2 or the chassis control module 304 of FIG. 3.

The method may begin at 500. At 502, the control module determines lateral acceleration force based on driver requested lateral acceleration and yaw moment equilibrium. Operation 502 corresponds to operations 406A and 406B of FIG. 4. At 504, the control module determines axle torque capacity based on tire model and normal force estimates. At 506, the control module estimates front and rear axle saturation levels. Operations 504 and 516 correspond to operation 406C of FIG. 4.

At 508, the control module determines whether the front axle is saturated. If true, then operation 510 is performed, otherwise operation 506 may be performed. The following operations 510 and 514 are examples of applying the above-described decay rates. At 510, the control module ramps down front axle longitudinal capacity. At 512, the control module determines whether the rear axle is saturated. If true, then operation 514 is performed, otherwise operation 506 may be performed. At 514, the control module ramps down rear axle longitudinal capacity.

At 516, the control module determines axle torque capacity based on a minimum value of predicted and corrected longitudinal capacities. At 518, the control module determines whether a driver torque request is less than or equal to a torque capacity of the rear axle. If true, operation 520 is performed, otherwise operation 522 is performed. At 520, the control module transfers torque to the rear axle.

At 522, the control module determines whether a driver torque request is less than or equal to a torque capacity of the front axle. If true, operation 524 is performed, otherwise operation 526 is performed. At 524, the control module transfers remaining torque to the front axle when torque provided to the rear axle is at a limit. At 526, the control module transfers remaining torque to rear axle to fulfill driver requested torque when torque provided to the front axle is at a limit. The control module may return to operation 502 subsequent to performing operations 520, 524, 526. Operations 518, 520, 522, 524, 526 correspond to operation 406D of FIG. 4.

The above-described algorithm is directed to satisfying tire load capacities. This is different than responding to vehicle responses, such as yaw rate and lateral velocity. The disclosed examples provide improved vehicle lateral performance, especially in limit-handling scenarios, which can be challenging given the number of uncertainties such as true knowledge of road conditions. In one embodiment and to maximize sustainable lateral acceleration in corners, the available tire capacity is entirely utilized. Under hard cornering maneuvers, maximum possible lateral accelerations is desired to enable sharper turns and higher corner-exiting speeds. The examples provide a torque split algorithm to distribute torque to front and rear axles to achieve maximum lateral grip for limit-handling while improving drive quality. Constraints adjustments are made based on tire capacities. The torque distribution is provided for sub-limit maneuvers, limit maneuvers, and exceeding limit maneuvers. The stated torque distribution is provided while accounting for effects in road surface and tire variation and controlling robustness of the system operation with respect to tire force accuracy.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An axle torque distribution system comprising:
  a memory configured to store a steering angle and a toque distribution algorithm for distributing torque to a first axle and a second axle of a vehicle; and
  a control module configured to execute the torque distribution algorithm to
    obtain the steering angle,
    based on the steering angle, determine a total lateral force requested for the first axle and the second axle,
    based on the total lateral force requested, determine a lateral force requested for the first axle and a lateral force requested for the second axle while constraining lateral force distribution between the first axle and the second axle, wherein the constraining of the lateral force distribution comprises, based on maximum lateral force capacities of tires of the vehicle, limiting the lateral force requested for the first axle and the lateral force requested for the second axle,
    determine available longitudinal capacities for the first axle and the second axle based on the lateral forces requested respectively for the first axle and the second axle,
    determine torque capacities of the first axle and the second axle based on the lateral forces requested respectively for the first axle and the second axle, and
    control distribution of torque to the first axle and the second axle based on the torque capacities of the first axle and the second axle.

2. The axle torque distribution system of claim 1, further comprising:
  a first torque source configured to supply torque to the first axle of the vehicle; and
  a second torque source configured to supply torque to the second axle of the vehicle,
  wherein the control module is configured to control torque output of the first torque source and torque output of the second torque source based on the torque capacities of the first axle and the second axle.

3. The axle torque distribution system of claim 1, wherein:
  the first axle is a front axle of the vehicle; and
  the second axle is a rear axle of the vehicle.

4. The axle torque distribution system of claim 1, wherein the control module is configured to:
  determine a lateral acceleration requested based on the steering angle input, a slip angle of the first axle, a slip angle of the second axle, a longitudinal velocity, and wheel base length of the vehicle; and determine the total lateral force requested based on the lateral acceleration requested.

5. The axle torque distribution system of claim 4, wherein the control module is configured to determine the longitudinal velocity based on a longitudinal acceleration of the vehicle, a yaw rate of the vehicle, and a speed of the vehicle.

6. The axle torque distribution system of claim 1, wherein the control module is configured to determine the lateral force for the first axle and the lateral force for the second axle such that a total yaw moment equilibrium of the vehicle is achieved.

7. The axle torque distribution system of claim 6, wherein the control module is configured to determine:

a first product based on a lateral force requested for the first axle and a distance between the first axle and a center of gravity of the vehicle;

a second product based on a lateral force requested for the second axle and a distance between the second axle and the center of gravity of the vehicle; and the lateral force requested for the first axle and the lateral force requested for the second axle based on a sum of (i) a difference between the first product and the second product, and (ii) a torque at the center of gravity of the vehicle due to a yaw moment of the vehicle.

8. The axle torque distribution system of claim 1, wherein the control module is configured to, while limiting lateral force distribution to the first axle and the second axle, (i) limit the lateral force requested for the first axle to a determined maximum lateral force for the first axle, and (ii) limit the lateral force requested for the second axle to a determined maximum lateral force for the second axle.

9. The axle torque distribution system of claim 8, wherein the control module is configured to:

limit the lateral force requested for the first axle based on a current road condition and a first normal tire force; and limit the lateral force requested for the second axle based on the current road condition and a second normal tire force.

10. The axle torque distribution system of claim 8, wherein the control module is configured to:

limit the lateral force requested for the first axle based on a first longitudinal force; and limit the lateral force requested for the second axle based on a second longitudinal force.

11. The axle torque distribution system of claim 8, wherein the control module is configured to determine:

the available longitudinal capacity for the first axle based on a first normal force and the first requested lateral force; and the available longitudinal capacity for the second axle based on a second normal force and the second requested lateral force.

12. The axle torque distribution system of claim 1, wherein the control module is configured to:

generate a first tire capacity for the first axle based on a longitudinal force of the first axle and a first decay rate;

generate a second tire capacity for the second axle based on a longitudinal force of the second axle and a second decay rate;

determine a torque capacity of the first axle based on the first tire capacity; and determine a torque capacity of the second axle based on the second tire capacity.

13. The axle torque distribution system of claim 1, wherein the control module is configured to:

determine the torque capacity of the first axle based on an effective rolling radius of a tire; and determine the torque capacity of the second axle based on the lateral force requested for the second axle and the effective rolling radius of the tire.

14. A method of distributing torque to a first axle and a second axle of a vehicle, the method comprising:

receiving a steering angle;

based on the steering angle, determining a total lateral force requested for the first axle and the second axle;

based on the total lateral force requested, determining a lateral force requested for the first axle and a lateral force requested for the second axle while constraining lateral force distribution between the first axle and the second axle, wherein the constraining of the lateral force distribution comprises, based on maximum lateral force capacities of tires of the vehicle, limiting the lateral force requested for the first axle and the lateral force requested for the second axle;

determining available longitudinal capacities for the first axle and the second axle based on the lateral forces requested respectively for the first axle and the second axle;

determining torque capacities of the first axle and the second axle based on the lateral forces requested respectively for the first axle and the second axle; and controlling distribution of torque to the first axle and the second axle based on the torque capacities of the first axle and the second axle.

15. The method of claim 14, further comprising:

determining a lateral acceleration requested based on the steering angle, a slip angle of the first axle, a slip angle of the second axle, a longitudinal velocity, and wheel base length of the vehicle;

determining the total lateral force requested based on the lateral acceleration requested; and determining the longitudinal velocity based on a longitudinal acceleration of the vehicle, a yaw rate of the vehicle, and a speed of the vehicle.

16. The method of claim 14, further comprising:

determining the lateral force for the first axle and the lateral force for the second axle such that a total yaw moment equilibrium of the vehicle is achieved;

determining a first product based on a lateral force requested for the first axle and a distance between the first axle and a center of gravity of the vehicle;

determining a second product based on a lateral force requested for the second axle and a distance between the second axle and the center of gravity of the vehicle; and determining the lateral force requested for the first axle and the lateral force requested for the second axle based on a sum of (i) a difference between the first product and the second product, and (ii) a torque at the center of gravity of the vehicle due to a yaw moment of the vehicle.

17. The method of claim 14, further comprising, while limiting lateral force distribution to the first axle and the second axle, (i) limiting the lateral force requested for the first axle to a determined maximum lateral force for the first axle, and (ii) limiting the lateral force requested for the second axle to a determined maximum lateral force for the second axle.

18. The method of claim 14, further comprising:
limiting the lateral force requested for the first axle based on a current road condition, a first normal tire force and a first longitudinal force;
limiting the lateral force requested for the second axle based on the current road condition, a second normal tire force and a second longitudinal force;
determining the available longitudinal capacity for the first axle based on a first normal force and the first requested lateral force; and
determining the available longitudinal capacity for the second axle based on a second normal force and the second requested lateral force.

19. The method of claim 14, further comprising:
generating a first tire capacity for the first axle based on a longitudinal force of the first axle and a first decay rate;
generating a second tire capacity for the second axle based on a longitudinal force of the second axle and a second decay rate;
determining a torque capacity of the first axle based on the first tire capacity; and
determining a torque capacity of the second axle based on the second tire capacity.

20. The method of claim 14, further comprising:
determining the torque capacity of the first axle based on an effective rolling radius of a tire; and
determining the torque capacity of the second axle based on the lateral force requested for the second axle and the effective rolling radius of the tire.

* * * * *